(12) United States Patent
Meyer

(10) Patent No.: US 6,789,567 B2
(45) Date of Patent: Sep. 14, 2004

(54) BI-DIRECTIONAL CONSTANT FLOW DEVICE

(75) Inventor: James Harvey Moore Meyer, Dallas, NC (US)

(73) Assignee: Hays Fluid Controls, division of ROMAC Industries, Inc., Dallas, NC (US)

( * ) Notice: Subject to any disclaimer, the term of this patent is extended or adjusted under 35 U.S.C. 154(b) by 0 days.

(21) Appl. No.: 10/292,037

(22) Filed: Nov. 12, 2002

(65) Prior Publication Data

US 2004/0089349 A1 May 13, 2004

(51) Int. Cl.[7] .............................. F16K 31/12; G05D 7/01
(52) U.S. Cl. ................... 137/517; 137/493.9; 137/504; 137/269.5; 251/120; 138/43
(58) Field of Search ........................... 137/269.5, 517, 137/528, 843, 493, 493.9, 504; 138/43, 46; 251/120, 121

(56) References Cited

U.S. PATENT DOCUMENTS

| | | | | |
|---|---|---|---|---|
| 2,910,093 A | * | 10/1959 | Dahl | 138/46 |
| 3,470,915 A | * | 10/1969 | Bitzer | 138/43 |
| 3,958,603 A | * | 5/1976 | Bannon et al. | 138/43 |
| 3,995,664 A | | 12/1976 | Nelson | |
| 4,105,050 A | | 8/1978 | Hendrickson et al. | |
| 4,165,764 A | * | 8/1979 | Grandclement | 138/43 |
| 4,562,861 A | * | 1/1986 | Payton | 137/493.9 |
| 4,708,166 A | * | 11/1987 | Kobold | 137/512.1 |
| 4,858,644 A | * | 8/1989 | Decker | 137/504 |
| 5,295,506 A | | 3/1994 | Smith | |
| 5,409,042 A | * | 4/1995 | Kirchner | 138/42 |
| 6,167,906 B1 | * | 1/2001 | Liberfarb | 137/501 |
| 6,311,712 B1 | | 11/2001 | Meyer | |
| 6,390,122 B1 | | 5/2002 | Zhang et al. | |

* cited by examiner

Primary Examiner—Ramesh Krishnamurthy
(74) Attorney, Agent, or Firm—Alston & Bird LLP

(57) ABSTRACT

A bi-directional flow-control device includes a housing defining a flow passage and first and second orifices installed in the passage, each orifice being tubular and having a seat, each seat having a plurality of circumferentially spaced flow-control channels, the seat of the second orifice being axially spaced from and facing the seat of the first orifice. A resiliently deformable diaphragm is disposed between the seats, whereby flow through the passage in a first direction urges the diaphragm against the seat of the first orifice and flow through the passage in an opposite second direction urges the diaphragm against the seat of the second orifice. The diaphragm in each case deforms into the channels in the seat to varying degrees as a function of pressure differential such that in either flow direction the flow is regulated to a substantially constant volumetric flow rate over a range of pressure differentials.

21 Claims, 2 Drawing Sheets

BI-DIRECTIONAL CONSTANT FLOW DEVICE

FIELD OF THE INVENTION

The present invention relates to flow control devices, and relates more particularly to constant-flow devices for regulating a fluid flow to a substantially constant flow rate over a range of pressure differentials.

BACKGROUND OF THE INVENTION

In many fluid systems there is a desire to regulate the fluid flow to a substantially constant volumetric flow rate over a range of pressure differentials. Most constant-flow valves are designed to provide a substantially constant flow rate of fluid flowing in one direction through the valve, but are not equipped to regulate fluid flow in an opposite direction to a constant flow rate.

In a heat exchanger system for alternatively heating and cooling, the required fluid flow rates are generally determined by the differential temperature that is available and the thermal energy transfer required. For example, secondary refrigeration systems, also known as hydronic systems, typically provide chilled water for cooling and heated water for heating. The chilled water typically is supplied at about 20 degrees F. lower than the desired final temperature, and the heated water is typically supplied at 60 to 100 degrees F. higher than the desired final temperature. As a result, the chilled water flow rate generally must be about three to five times that of the heated water flow rate. This difference in flow rates is not an issue when separate cooling and heating heat exchangers are used on separate cooling and heating fluid circuits; two separate uni-directional constant-flow valves are simply used in the two separate fluid circuits to achieve the required different flow rates for heating and cooling. However, it would be desirable to simplify the system by using a single heat exchanger connected to the separate fluid circuits for both cooling and heating. In that case, it would be desirable to have a single flow-control device that could regulate the flow to a first flow rate in one flow direction for cooling and to a second flow rate in the opposite direction for heating.

SUMMARY OF THE INVENTION

The present invention addresses the above problem and achieves other advantages by providing a flow control device capable of regulating a fluid flow to a substantially constant volumetric flow rate whether the fluid flows in one direction or in the opposite direction through the device. The flow rate in the one direction can be the same as or different from the flow rate in the opposite direction, yet the device is particularly simple in construction.

In accordance with a first aspect of the invention, a bi-directional flow-control device includes a housing defining a flow passage therethrough, and first and second orifices formed separately from the housing and installed in the passage thereof, each orifice being tubular and having a seat defined at one end, each seat having a plurality of flow-control channels extending transversely therein and spaced apart circumferentially, the seat of the second orifice being axially spaced from and facing the seat of the first orifice. A resiliently deformable diaphragm is disposed in the passage between the seats of the orifices, whereby flow through the passage in a first direction urges the diaphragm against the seat of the first orifice and flow through the passage in an opposite second direction urges the diaphragm against the seat of the second orifice, the diaphragm in each case deforming into the channels in the seat to varying degrees as a function of pressure differential across the diaphragm such that in either flow direction the flow is regulated to a substantially constant volumetric flow rate over a range of pressure differentials.

The diaphragm is held in a generally coaxial alignment with the seats of the orifices by a cage arrangement formed separately from the housing and installed in the flow passage between the seats. In one embodiment, the cage can comprise first and second spiders joined with the first and second orifices, respectively. Each spider comprises a plurality of circumferentially spaced, axially extending legs each having a fixed end joined to the respective orifice and extending toward the other orifice and terminating in a free end. The spiders allow the diaphragm to float freely between the seats of the orifices. The legs of the first spider are circumferentially spaced from and axially overlap with the legs of the second spider. Each orifice and its associated spider preferably comprise a one-piece molded structure. The structure can be molded of a substantially rigid resin composition. In another embodiment, the cage comprises a generally tubular structure formed separately from the orifices and having legs that project radially for centering the diaphragm in the flow passage.

The flow-control channels in the first orifice seat can be configured substantially differently from the channels in the second orifice seat so that the volumetric rate of flow in one direction through the device is substantially different from the rate of flow in the opposite direction. Preferably, the diaphragm is symmetric such that its opposite sides that engage the seats are identical, thereby allowing the diaphragm to be installed in one orientation or an opposite orientation without affecting the performance of the device.

In accordance with another aspect of the invention, a bi-directional flow-control device comprises a housing having a passage and first and second orifices and a diaphragm generally as noted above. The first orifice is inserted axially into the passage so as to be coaxial with the passage, and a first retainer is inserted axially into the passage from one end thereof and fixed therein to prevent the first orifice from moving axially toward the one end of the passage. The second orifice is likewise inserted axially into the passage and a second retainer is inserted axially into the passage from the opposite end thereof and fixed in the passage to prevent the second orifice from moving axially toward the opposite end of the passage. The retainers preferably comprise generally disk-shaped members inserted into the passage such that outer peripheries of the retainers frictionally engage the inner surface of the passage to fix the retainers in place axially in the passage. The retainers have flow passages therein to allow fluid to flow through them.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
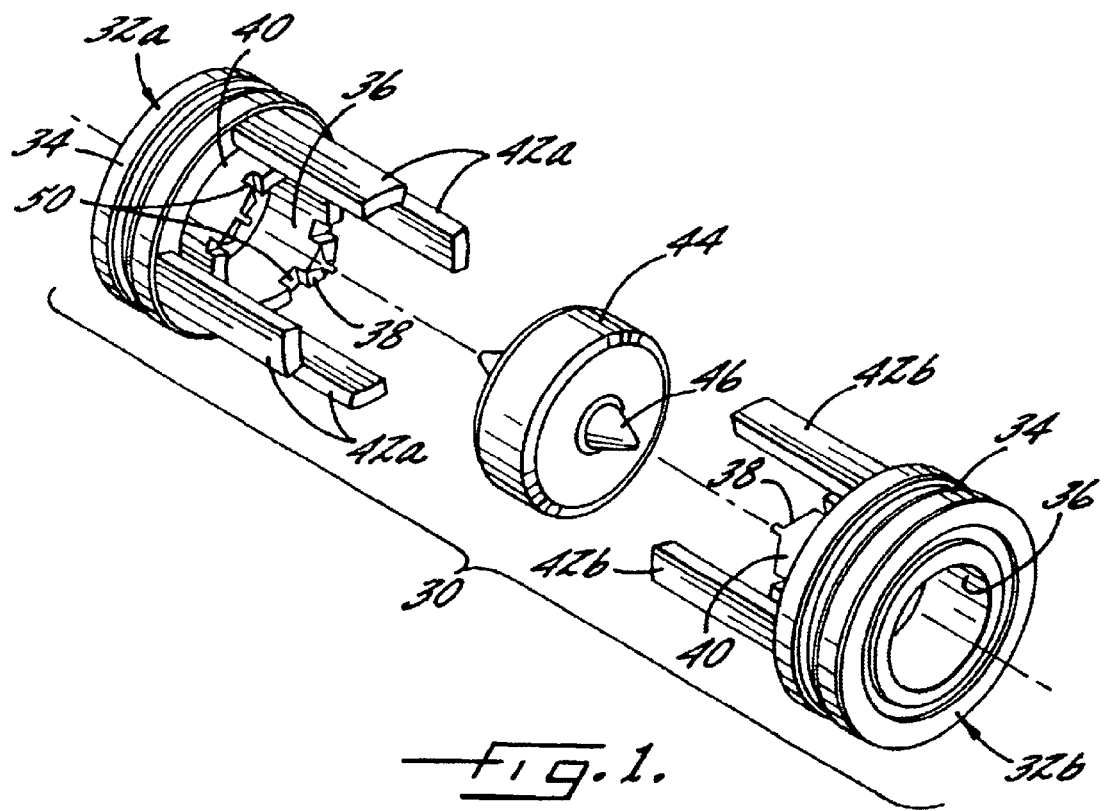
FIG. 1 is an exploded view of a subassembly of a bi-directional flow-control device in accordance with one embodiment of the invention, comprising a pair of orifices and a diaphragm.
Figure 2:
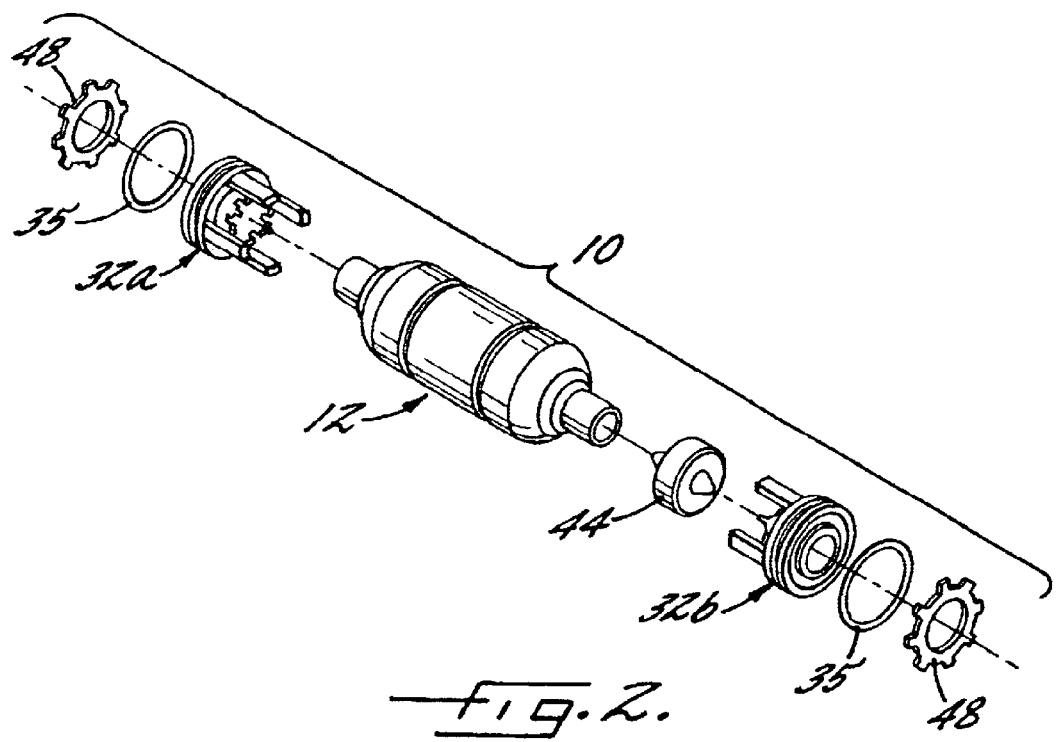
FIG. 2 is an exploded view of the entire flow-control device.
Figure 3:
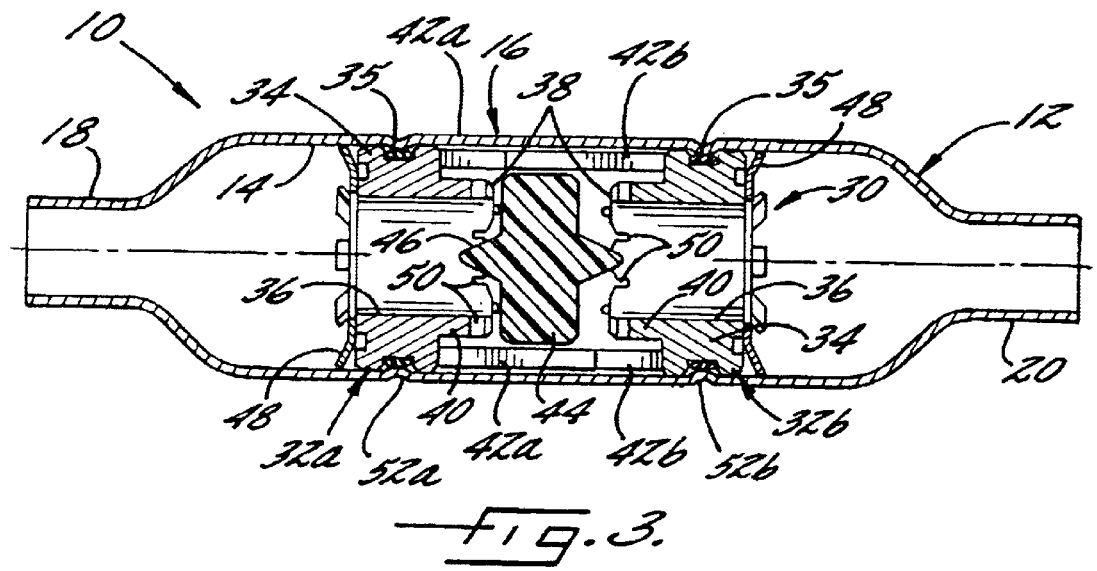
FIG. 3 is a cross-sectional view of the flow-control device.

FIGS. 1–3 depict a bi-directional flow-control device 10 and components thereof, in accordance with one preferred embodiment of the invention. The device includes a housing 12 preferably of tubular shape defining a passage 14 for the flow of fluid from one end to the opposite end of the housing. The housing 12 in the illustrated embodiment has a central portion 16 of substantially cylindrical shape, a tubular first end portion 18 that tapers from a larger diameter at one end to a smaller diameter at the other end, and a second end portion 20 that likewise tapers. The tapering end portions are provided to allow piping to be attached to the opposite ends of the housing 12 by sweat fittings, for example. The housing 12 preferably comprises a one-piece structure. The tapering of the end portions 18, 20 preferably is accomplished by mechanical techniques (e.g., swaging) after the internal components of the device have been inserted into the housing passage.

Within the passage of the central portion 16 of the housing, an assembly 30 of flow-control components is installed. More particularly, the assembly 30 includes a first orifice 32a, a second orifice 32b, and a resiliently deformable diaphragm 44. Each orifice includes a generally tubular outer wall or support portion 34 having a diameter slightly less than that of the inner surface of the housing, and having a central flow passage 36 therethrough. The outer peripheral surface of each tubular support portion 34 includes an annular groove in which an O-ring 35 is installed. The O-rings 35 are compressed radially inwardly by the inner surface of the housing so as to seal the connection between the housing and the orifices to prevent fluid from flowing therebetween. A seat 38 is defined by each orifice at an upstream end thereof. The seat 38 is formed on a tubular portion 40 of the orifice having a smaller diameter than that of the tubular support portion 34 and joined to the tubular support portion concentrically therewith. The first orifice 32a also includes an integral spider comprising a plurality of legs 42a integrally formed with the tubular support portion 34 of the orifice. The legs 42a are circumferentially spaced from one another and extend from the tubular support portion 34 in the upstream direction of the first orifice 32a beyond the seat 38 of the orifice. Four legs 42a are shown in the illustrated embodiment, spaced 90° apart, but it will be understood that a different number of legs can be used if desired. The legs comprise generally beam-shaped members in the illustrated embodiment, but other shapes can be used instead. The second orifice 32b likewise includes an integral spider comprising a plurality of legs 42b integrally formed with the tubular support portion 34 of the orifice. The legs 42b are circumferentially spaced from one another and extend from the tubular support portion 34 in the upstream direction of the second orifice 32b beyond the seat 38 of the orifice. Each orifice and its associated legs are formed as a one-piece structure, preferably by molding.

The first and second orifices 32a, 32b are installed in the housing 12 with their seats 38 axially spaced apart and facing each other. Thus, the legs 42a of the first orifice extend axially toward the second orifice 32b, and likewise the legs 42b of the second orifice extend axially toward the first orifice 32a. The orifices are installed such that the legs 42a are circumferentially spaced from and axially overlap with the legs 42b. The legs 42a,b collectively form a cage within which the diaphragm 44 is contained. The diaphragm 44 acts in conjunction with the orifices to control the rate of fluid flow through the valve in either direction. The diaphragm comprises a solid (i.e., non-foraminous) disc-shaped piece of elastomeric material. The outer peripheral surface of the diaphragm is substantially cylindrical and has a diameter sized to allow the diaphragm to fit between the legs 42a,b of the orifices. Preferably, there is sufficient radial clearance between the diaphragm and the legs to allow the diaphragm to freely move axially toward and away from the seat 38 of each of the orifices. The diaphragm 44 has opposite end faces preferably formed identically to each other, and advantageously formed as planar surfaces. Alternatively, the end faces could be conical, spherical, or shaped as some other surface of a body of revolution, such that the diaphragm can be rotated about its axis without affecting the interface between the diaphragm and the seat 38 of each orifice. Each of the end faces of the diaphragm can have a flow-straightening cone 46 formed thereon.

The flow-control device 10 also includes a pair of retaining members 48 that are inserted into the passage of the housing 12 behind each of the orifices 32a, 32b to prevent each of the orifices from moving axially away from the diaphragm. The retaining members 48 preferably operate by frictionally engaging the inner surface of the housing, and preferably are shaped so that they can be pushed relatively easily into each end of the cylindrical passage of the housing (prior to the end portions 18, 20 being mechanically tapered) but cannot readily be slid back out the end through which they were inserted. As illustrated, the retaining members 48 can comprise finger spring washers formed of a spring steel. The outer diameter of the finger spring washers in their undeformed condition is slightly greater than the inner diameter of the housing; thus, when the washers are inserted into the housing, the radially extending fingers of the washers are deformed to tilt away from the direction in which the washers are pushed, and hence the washers cannot readily be moved in the direction toward which the fingers are tilted.

When fluid flows through the flow-control device 10 in a first axial direction from the end portion 20 to the end portion 18, the diaphragm 44 is urged against the seat 38 of the first orifice 32a. The legs 42a,b of the integral spiders align the diaphragm in the radial direction so that the end face of the diaphragm contacts the seat 38 about its entire circumference. The legs also space the diaphragm away from the inner surface of the housing so that a consistent and predictable flow passage exists between the outer peripheral surface of the diaphragm and the inner surface of the housing. The fluid flows through this flow passage, and then is turned by the tubular support portion 40 of the orifice 32a so as to flow radially inwardly and then through flow control passages defined between the end face of the diaphragm and the seat 38, and finally out the central passage 38 of the orifice and out the end portion 18 of the housing. Similarly, flow in the opposite direction from the end 18 to the opposite end 20 of the housing causes the diaphragm to be urged against the seat 38 of the second orifice 32b, and the fluid flows through flow control passages defined between the end face of the diaphragm and the seat 38. Each seat 38 is contoured to be non-planar and includes a plurality of circumferentially spaced flow-control channels 50. As the pressure differential across the diaphragm increases, the diaphragm is pressed with greater and greater pressure against the seat and deforms so as to conform to a greater and greater extent with the contour of the seat. Accordingly, the flow passages between the diaphragm and seat become smaller and smaller, which compensates for the increasing pressure differential so as to maintain the flow rate through the valve substantially constant, at least over a limited range of pressure differentials, such as about 0.1 bar to 10 bars.

The seats 38 of the first and second orifices can be identically shaped if it desired to achieve the same constant flow rate in each flow direction of the device 10. Alternatively, when it is desired for the flow rates in the two directions to be different, the seats 38 are differently shaped. The diaphragm 44 preferably is symmetrically shaped so that it can be reversed in orientation without affecting the performance of the device.

As noted, the housing 12 preferably is a one-piece structure. As such, the housing initially must have a substantially constant diameter along its length. The device 10 is assembled by inserting the first orifice 32a into the end 18 of the housing (from left to right in FIG. 3). A finger spring washer 48 is then inserted into the housing behind the first orifice 32a. The diaphragm 44 is then inserted into the opposite end 20 of the housing so that it rests against the seat 38 of the first orifice. Next, the second orifice 32b is inserted into the end 20 of the housing. A finger spring washer 48 is inserted into the housing behind the second orifice 32b. Preferably, once the orifices are in place in the housing, the housing is operated upon to form detents 52a and 52b, which comprise annular regions of the housing that are compressed radially inwardly to protrude radially inward from the inner surface of the housing. The detents 52a,b are axially aligned with corresponding annular grooves in the outer surfaces of the orifices 32a,b, and O-rings 35 are retained in such grooves. The detents 52a,b compress the O-rings 35 to form seals substantially preventing flow from passing between the orifices' outer surfaces and the inner surface of the housing. Finally, if reduced-diameter ends are desired for the housing, the end portions 18, 20 are swaged or otherwise mechanically operated upon to taper them to smaller diameters, which may be desirable for attaching piping to the device by sweating, for example.

Figure 4:
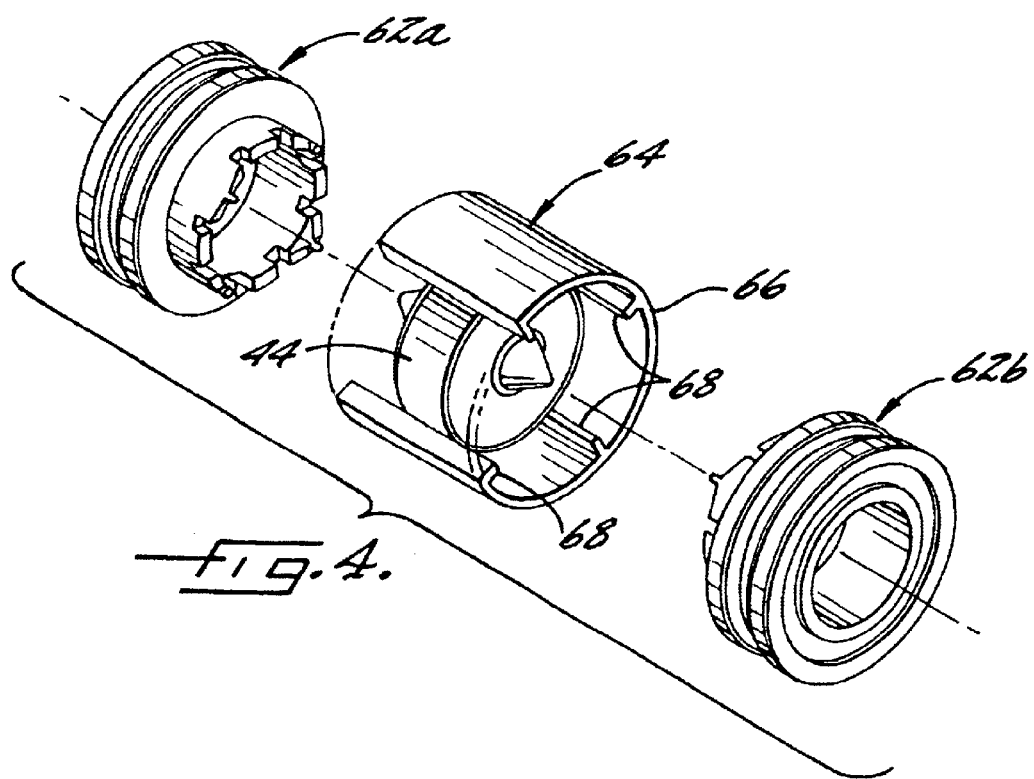
FIG. 4 is an exploded view of a subassembly similar to that of FIG. 1, but showing an alternative embodiment in which a separate cage replaces the integral spiders.

FIG. 4 is a view similar to FIG. 1, showing an alternative embodiment of a subassembly for a bi-directional flow control device in accordance with the invention. The subassembly includes a first orifice 62a and a second orifice 62b generally similar to the first and second orifices 32a,b previously described (but lacking integral spiders), and a cage 64 that takes the place of the spiders of the FIG. 1 embodiment. The cage 64 is a generally tubular structure having a circumferentially extending outer wall 66 and a plurality of legs 68 that project radially inwardly from the outer wall. The legs 68 are spaced apart circumferentially (e.g., every 90° as shown). The radially inner ends of the legs 68 have a radius slightly greater than that of the diaphragm 44 such that the diaphragm is aligned by the legs 68 to be substantially coaxial with the cage's outer wall 66 (and hence coaxial with the housing of the flow control device), yet the diaphragm is able to float axially in the cage to engage the seats of the orifices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A bi-directional flow control device for regulating a fluid flow to a substantially constant volumetric flow rate, the device comprising:

a housing defining a flow passage therethrough;

first and second orifices formed separately from the housing and installed in the passage thereof, each orifice being tubular and having a seat defined at one end thereof, each seat having a plurality of flow-control channels extending transversely therein and spaced apart circumferentially, the seat of the second orifice being axially spaced from and facing the seat of the first orifice;

a resiliently deformable non-foraminous diaphragm disposed in the passage between the seats of the orifices, whereby flow through the passage in a first direction urges the diaphragm against the seat of the first orifice and flow through the passage in an opposite second direction urges the diaphragm against the seat of the second orifice, the diaphragm in each case deforming into the channels in the seat to varying degrees as a function of pressure differential across the diaphragm such that in either flow direction the flow is regulated to a substantially constant volumetric flow rate over a range of pressure differentials; and a cage formed separately from the housing and installed in the flow passage for holding the diaphragm generally coaxially aligned with the orifices and allowing the diaphragm to float freely between the seats of the orifices.

2. The bi-directional flow control device of claim 1, wherein the cage comprises a first spider and a second spider joined with the first and second orifices, respectively, each spider comprising a plurality of circumferentially spaced, axially extending legs each having a fixed end joined to the respective orifice and extending toward the other orifice and terminating in a free end, the spiders cooperating to hold the diaphragm generally coaxially aligned with the orifices and allow the diaphragm to float freely between the seats of the orifices, the legs of the first spider being circumferentially spaced from and axially overlap with the legs of the second spider.

3. The bi-directional flow control device of claim 1, wherein the flow-control channels of the first orifice are of substantially different configuration from the flow-control channels of the second orifice such that the substantially constant volumetric flow rate in the first direction substantially differs from the substantially constant volumetric flow rate in the second direction.

4. The bi-directional flow control device of claim 1, wherein the diaphragm has a first face opposing the seat of the first orifice and a second face opposing the seat of the second orifice, and a generally cylindrical side wall extending between the first and second faces.

5. The bi-directional flow control device of claim 4, wherein the diaphragm is symmetrical such that the first and second faces have an identical configuration and the diaphragm can be installed in the housing with either face facing either of the seats without affecting the volumetric flow rates of the device.

6. The bi-directional flow control device of claim 1, wherein each orifice has a generally cylindrical outer surface in which an annular groove is formed and a resiliently deformable O-ring is installed in each groove, the O-rings being radially inwardly compressed by an inner surface of the housing to prevent flow between the outer surfaces of the orifices and the inner surface of the housing.

7. The bi-directional flow control device of claim 2, wherein each orifice and the respective spider joined thereto are molded as a one-piece structure.

8. The bi-directional flow control device of claim 1, wherein the housing comprises a one-piece structure having a tubular central portion and tubular first and second end portions joined to opposite ends of the central portion, the central portion having a substantially constant diameter from one end to the other end thereof and the end portions each tapering to a substantially smaller diameter than that of the central portion, an assembly comprising the diaphragm and the orifices residing substantially within the central portion.

9. The bi-directional flow control device of claim 8, further comprising a pair of retainers inserted into the passage of the housing on opposite sides of said assembly to assist in fixing said assembly axially within the passage.

10. The bi-directional flow control device of claim 9, wherein the retainers comprise finger spring washers.

11. The bi-directional flow control device of claim 8, wherein the diaphragm is symmetrical such that opposite faces thereof have an identical configuration and the diaphragm can be installed in the housing with either face facing either of the seats without affecting the volumetric flow rates of the device.

12. A bi-directional flow control device for regulating a fluid flow to a substantially constant volumetric flow rate, the device comprising:

a housing defining a flow passage therethrough, the passage having a generally cylindrical inner surface;

a first tubular orifice inserted axially into the passage so as to be coaxial with the passage, and a first retainer inserted axially into the passage from one end thereof and fixed therein to prevent the first orifice from moving axially toward said one end of the passage, the first orifice defining a seat facing toward an opposite end of the passage, the seat comprising a sculptured flow-control surface having a plurality of transverse flow-control channels therein;

a second tubular orifice inserted axially into the passage so as to be coaxial with the passage, and a second retainer inserted axially into the passage from said opposite end thereof and fixed therein to prevent the second orifice from moving axially toward said opposite end of the passage, the second orifice defining a seat facing toward said one end of the passage and axially spaced from the seat of the first orifice, the seat of the second orifice comprising a sculptured flow-control surface having a plurality of transverse flow-control channels therein; and a resiliently deformable non-foraminous diaphragm inserted axially into the passage and disposed between the seats of the first and second orifices so as to float freely therebetween, whereby flow through the passage in a first direction urges the diaphragm against the seat of the first orifice and flow through the passage in an opposite second direction urges the diaphragm against the seat of the second orifice, the diaphragm in each case deforming into the channels in the seat to varying degrees as a function of pressure differential across the diaphragm such that in either flow direction the flow is regulated to a substantially constant volumetric flow rate over a range of pressure differentials.

13. The bi-directional flow control device of claim 12, wherein the retainers comprise generally disk-shaped members inserted into the passage such that outer peripheries of the retainers frictionally engage the inner surface of the passage to fix the retainers in place axially in the passage, the retainers having flow passages therein.

14. The bi-directional flow control device of claim 13, wherein the retainers are each configured such that the retainer axially slides relatively easily in the passage in one direction but sliding of the retainer axially in an opposite direction causes the outer periphery of the retainer to frictionally grip the inner surface of the passage to a greater degree so as to substantially prevent further sliding of the retainer in the opposite direction.

15. The bi-directional flow control device of claim 14, wherein the outer periphery of each retainer is formed such that frictional forces on the outer periphery when sliding the retainer in said opposite direction tend to cause the outer periphery to increase in diameter and thereby increase the frictional forces.

16. The bi-directional flow control device of claim 15, wherein the retainers comprise finger spring washers each having a central passage therethrough and a plurality of generally radially extending fingers that in an undeformed condition extend to an outer diameter slightly greater than that of the passage in the housing, whereby insertion of the retainer into the passage in said one direction deforms the fingers generally in said opposite direction.

17. The bi-directional flow control device of claim 12, further comprising a first spider connected with the first orifice and a second spider connected with the second orifice, the spiders holding the diaphragm generally coaxially aligned with the seats of the orifices.

18. The bi-directional flow control device of claim 17, wherein each of the spiders comprises a plurality of generally axially extending legs attached to the respective orifice and spaced apart circumferentially.

19. The bi-directional flow control device of claim 18, wherein each of the legs of each spider has a fixed end attached to the respective orifice and an opposite free end.

20. The bi-directional flow control device of claim 19, wherein the legs of the first spider are circumferentially spaced from and axially overlap with the legs of the second spider.

21. The bi-directional flow control device of claim 17, wherein each orifice and the spider connected therewith comprise a one-piece molded structure.

* * * * *